May 15, 1962
F. LAURENT
3,034,404
VARIABLE FOCAL OBJECTIVES
Filed May 19, 1959
2 Sheets-Sheet 1
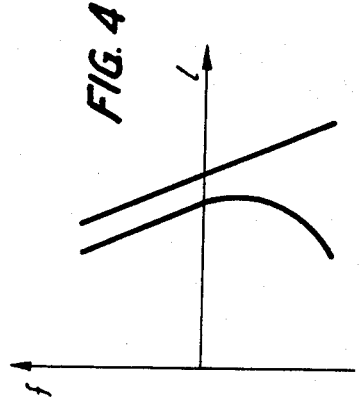
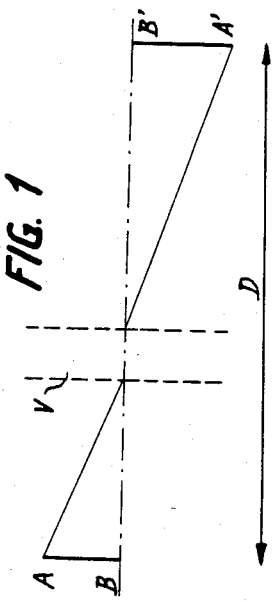
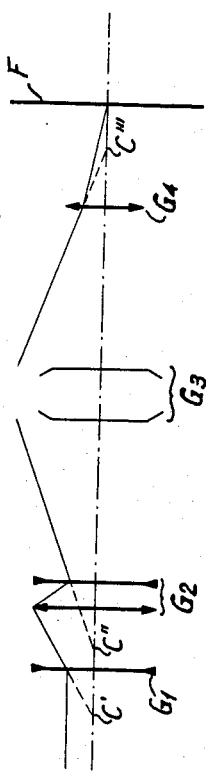
INVENTOR
FRANCOIS LAURENT
By Emery L. Groff
Atty

United States Patent Office 3,034,404
Patented May 15, 1962

3,034,404
VARIABLE FOCAL OBJECTIVES
Francois Laurent, Yverdon, Switzerland, assignor to Paillard S.A., Sainte-Croix, Switzerland, a corporation of Switzerland
Filed May 19, 1959, Ser. No. 814,262
Claims priority, application Switzerland Nov. 13, 1958
4 Claims. (Cl. 88—57)

Variable focal objectives are divided into two principal groups: those with optical compensation and those with mechanical compensation. The objectives appertaining to a second group have, in general, a smaller overall size than those of the first group, for a same opening and a same variation of the focal distance. Usually, these objectives comprise two groups of movable lenses disposed between two groups of stationary lenses. The variation of the focal distance of the objective is obtained by varying the relative positions of the two movable groups relatively to two stationary groups, the movements of the two movable groups being, in general, controlled by means of a rotary part having two ramps determining the position of each of the movable groups. The machining of these ramps is a delicate operation which must be effected with great accuracy.

The present invention has for its subject a variable focal objective of the mechanical compensation type comprising two groups of movable lenses located between two groups of stationary lenses. In this objective it is possible to obtain a relatively simple shape of the ramps and the relatively small movements of the movable groups by reason of the fact that one of the movable groups is constituted by an assembly of lenses of the Galilean type, the other movable group being of the convergent system.

One form of construction of an objective, subject of the invention, is shown by way of example in the accompanying drawings, wherein:

FIG. 1 is an explanatory diagram.

FIG. 2 is a diagrammatic representation of the said objective.

FIG. 4 shows the form of ramps used for provoking the movement of the two movable groups of the objective according to FIG. 3.

Figures 3A, 3B, 3C:
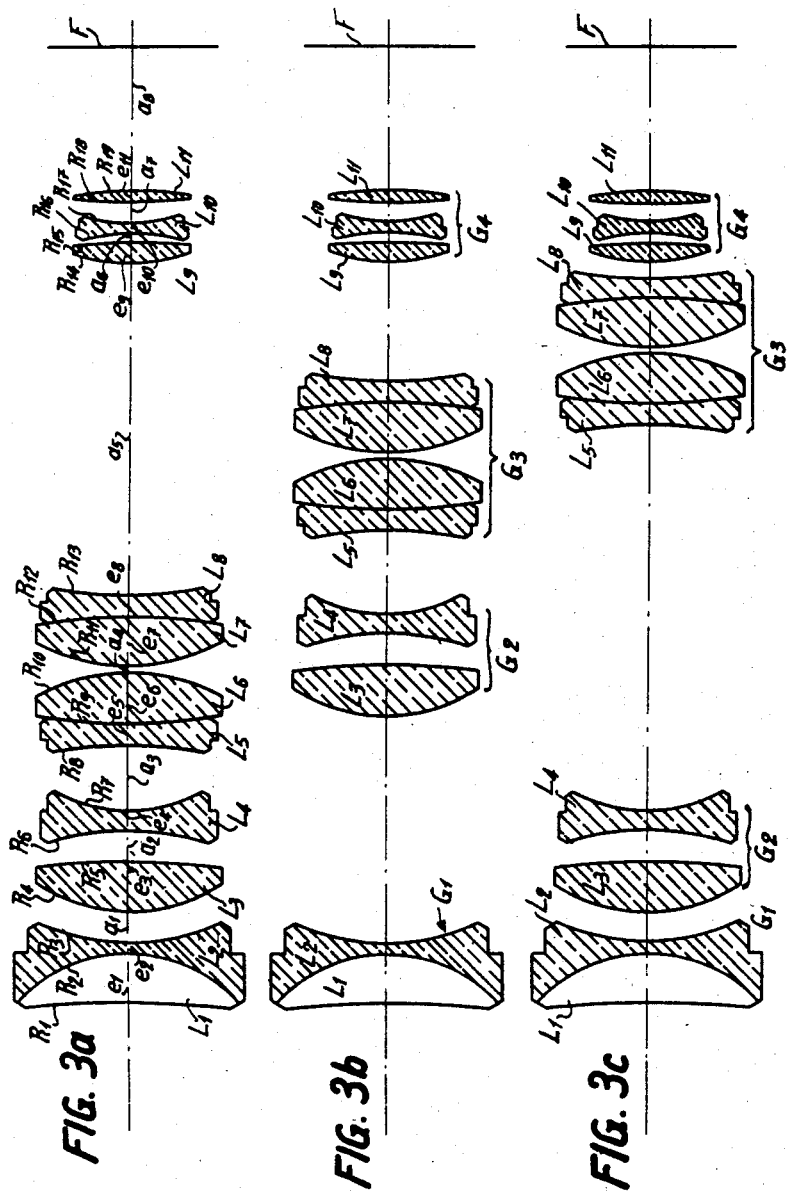
FIGS. 3a, 3b and 3c show in section the said form of construction for three different adjustments of the focal distance.

With reference to FIG. 1, it is to be recalled that an optical assembly of positive focal length $f$, which constitutes the variator represented diagrammatically by V, produces from an object AB an image A'B' such that if $g$ is the magnification under which it operates, the following relation between $g$, $f$ and D, where D represents the object image distance, is obtained:

$$D = \frac{f}{g} + 2f + fg$$

When $g$ is caused to vary, the distance D does not remain constant, it is minimum for $g=1$ and increases rapidly for high or weak magnifications.

With reference to FIG. 2, there is indicated diagrammatically the constitution of an objective of variable focus, which comprises a first front group $G_1$ which is stationary and divergent and a last group $G_4$ which is also stationary, but convergent. It will be obvious to one skilled in the art that the stationary groups $G_1$ and $G_4$ may be indifferently convergent or divergent, provided that the general convergency is respected. Between these groups are disposed two movable groups $G_2$ and $G_3$, which are movable along the optical axis according to a well determined law. The group $G_3$ is a convergent system, whilst the group $G_2$ is constituted by an assembly of lenses of the Galilean type.

In principle, the group $G_2$ should be afocal but experience has shown that the interval of air separating the two components of the afocal system may vary substantially to one side or the other of its nominal value. Further, it is easy to provide that the group $G_2$ has a relatively high and negative Petzval sum. It is possible to give this group a value such that the Petzval sum, which is negative, has an absolute value of the same order of magnitude as the Petzval sum total of the other three groups $G_1$, $G_3$, $G_4$, said latter sum being positive. In this manner the Petzval sum for the whole objective may be maintained at a very low value, preferably zero, which corresponds to the usual criterion of quality for an objective.

According to the diagram in FIG. 2, the formation of a real image on the film is obtained in the following manner:

The first divergent group $G_1$, called "head objective," provides a virtual image in the vicinity of its focus image at C', this direct image is taken by the afocal system $G_2$ which yields another virtual image at C'' always direct, said virtual image serves as actual object for the variator V, constituted by the group $G_3$, which transports this image to C''', real and therefore reversed.

The conjugate of C''' through the stationary group $G_4$ is the plane of the film.

FIGS. 3a, 3b and 3c represent an objective of which the amplitude of variation of the focal distance is four times and thus the opening is F:2.8. FIG. 3a shows the position of the movable groups for which there is obtained the longest focal distance, namely 200 mm. FIGS. 3b and 3c show the position of these groups for obtaining a focal distance of 100 and 50 mm. respectively, this latter distance being the smallest focal distance of the objective.

The characteristics set out in connection with this objective, are indicated hereinafter, the radii of the curvature of the faces of these lenses being preceded by the sign "+" when the centre of curvature is to the right of the face considered, with reference to the drawing, and by the sign "—" when this center is to the left. All the sizes are indicated in millimeters. The thicknesses of the lenses are indicated by "$e$" and the air spaces between the by "$a$." The refractive index and the Abbe V number of the glasses are indicated by "$n_D$" and "$\nu$." The lenses are designated, in sequence by $L_1, L_2 \ldots L_{11}$, the front lens being $L_1$.

| L | R in mm. | e in mm. | $n_D$ | $\nu$ |
|---|---|---|---|---|
| $L_1$ | $R_1 = -603.63$ | $e_1 = 24.10$ | 1.62000 | 36 |
| $L_2$ | $R_2 = -84.51$ | $e_2 = 12.10$ | 1.62000 | 60 |
| $L_3$ | $R_3 = +134.61$ $R_4 = +103.22$ | $e_3 = 30.20$ | 1.72000 | 50 |
| $L_4$ | $R_5 = -435.64$ $R_6 = -161.29$ | $e_4 = 12.10$ | 1.72300 | 38 |
| $L_5$ | $R_7 = +94.59$ $R_8 = -256.50$ | $e_5 = 12.10$ | 1.7315 | 28 |
| $L_6$ | $R_9 = +351.31$ | $e_6 = 30.20$ | 1.7448 | 45 |
| $L_7$ | $R_{10} = -120.73$ $R_{11} = +120.73$ | $e_7 = 30.20$ | 1.7448 | 45 |
| $L_8$ | $R_{12} = -351.31$ | $e_8 = 12.10$ | 1.7315 | 28 |
| $L_9$ | $R_{13} = +256.50$ $R_{14} = +103.22$ | $e_9 = 12.10$ | 1.6200 | 60 |
| $L_{10}$ | $R_{15} = -435.64$ $R_{16} = -120.73$ | $e_{10} = 6$ | 1.6200 | 36 |
| $L_{11}$ | $R_{17} = +94.59$ $R_{18} = +351.31$ $R_{19} = -211.30$ | $e_{11} = 12.10$ | 1.6200 | 60 |

The distances "a" between the lenses are given hereinafter for the three focal distances of 50, 100 and 200 mm.

| a | f=50 mm. | f=100 mm. | f=200 mm. |
|---|---|---|---|
| $a_1$ | 18.10 | 134.50 | 18.10 |
| $a_2$ | 19.00 | 19.00 | 19.00 |
| $a_3$ | 228.50 | 50.20 | 41.80 |
| $a_4$ | 3.00 | 3.00 | 3.00 |
| $a_5$ | 11.8 | 73.7 | 198.5 |
| $a_6$ | 6.0 | 6.0 | 6.0 |
| $a_7$ | 12.10 | 12.10 | 12.10 |
| $a_8$ | 87.40 | 87.40 | 87.40 |

FIG. 4 shows the absolute movements which the two movable groups should effect during the variation of the focal distance, the curve $a$ referring to group $G_2$ and the curve $b$ to the group $G_3$.

I claim:

1. A variable focal-length objective lens system of the mechanical compensation type, comprising, in combination, a system of lenses positioned at the front and a system of lenses positioned at the rear, said lenses in each system and each system being stationary, said front system of lenses being of negative power and said rear system of lenses being of positive power, a system of lenses of the Galilean type movably positioned between said two stationary systems and nearer said front stationary system than said rear stationary system, and a convergent system of lenses movably positioned between said Galilean type system and said rear stationary system, said Galilean type system being of the afocal type, the Petzval sum of said front system and said rear system and said movably positioned convergent system being a positive absolute value, the Petzval sum of said Galilean type system being a negative absolute value, said two absolute values being substantially equal, whereby the Petzval sum of the objective is maintained at a very low value, the position of each lens in each of the movably positioned Galilean type system and of the movably positioned convergent system being fixed with respect to the remainder of the respective system, said stationary systems and said movably positioned systems being on a common optical axis, the ratio of the shortest focal length to the longest focal length of the objective lens system being 1:4, the relationship in the variable focal-length objective lens system between the focal length, the power under which the objective lens system operates, and the object image distance being exemplified by the algebraic expression.

$$D=\frac{f}{g}+2f+fg$$

D representing the object image distance, $f$ representing the focal length, and $g$ representing the power of the objective lens system, whereby there is formed an objective of excellent quality in which magnification of said objective is not changed upon movement of said Galilean type system along the optical axis and the image is kept in the plane of the image receiving film upon movement of said Galilean type system.

2. A variable focal-length objective lens system of the mechanical compensation type, comprising, in combination, a system of lenses positioned at the front and a system of lenses at the rear, said lenses in each system and each system being stationary, said front system of lenses being of negative power and said rear system of lenses being of positive power, a system of lenses of the Galilean type movably positioned between said two stationary systems, and a convergent system of lenses movably positioned between said Galilean type system and said rear stationary system, said Galilean type system being of the afocal type, said systems being on a common optical axis, the Petzval sum of said front system and said rear system and said movably positioned convergent system being a positive absolute value, the Petzval sum of said Galilean type system being a negative absolute value, said two absolute values being substantially equal, whereby the Petzval sum of the objective is maintained at a very low value approaching zero thereby forming an excellent quality objective, the relationship in the variable focal-length objective lens system between the focal length, the power under which the objective lens system operates, and the object image distance being exemplified by the algebraic expression $$D=\frac{f}{g}+2f+fg$$

D representing the object image distance, $f$ representing the focal length, and $g$ representing the power of the objective lens system.

3. A variable focal-length objective lens system of the mechanical compensation type, comprising, in combination, a system of lenses positioned at the front and a system of lenses at the rear, said lenses in each system and each system being stationary, said front system of lenses being of negative power and said rear system of lenses being of positive power, a system of lenses of the Galilean type movably positioned between said two stationary systems, and a convergent system of lenses movably positioned between said Galilean type system and said rear stationary system, said Galilean type system being of the afocal type, said systems being on a common optical axis, the Petzval sum of said front system and said rear system and said movably positioned convergent system being a positive absolute value, the Petzval sum of said Galilean type system being a negative absolute value, said two absolute values being substantially equal, whereby the Petzval sum of the objective is maintained at a value approaching zero, the ratio of the shortest focal length of the objective lens system to the longest focal length of the objective lens system being 1:4, the axial distance between the front stationary system and the movably positioned Galilean type system being equal for a focal length ranging from the shortest focal length to the longest focal length of the objective lens system, the axial distance between the rear stationary system and the movably positioned convergent system being approximately 17 times greater for the longest focal length of the objective lens system than for the shortest focal length of the objective lens system, the axial distance between the front stationary system and the movably positioned Galilean type system being approximately 1.5 times the axial distance between the rear stationary member and the movably positioned convergent system for the shortest focal length of the objective lens system and approximately 0.09 times the axial distance between the rear stationary member and the movably positioned convergent system for the longest focal length of the objective lens system, the relationship in the objective lens system between the focal length, the power under which the objective lens system operates, and the object image distance being exemplified by the algebraic expression $$D=\frac{f}{g}+2f+fg$$

D representing the object image distance, $f$ representing the focal length, and $g$ representing the power of the objective lens system.

4. A variable focal-length objective lens system of the mechanical compensation type, comprising, in combination, a system of lenses positioned at the front and a system of lenses positioned at the rear, said lenses in each system and each system being stationary, a system of lenses of the Galilean type movably positioned between said two stationary systems, and a convergent system of lenses movably positioned between said Galilean type system and said rear stationary system, said Galilean type system being of the afocal type, said systems being on a common optical axis, the Petzval sum of said front system and said rear system and said movably positioned convergent system being a positive absolute value, the Petzval sum of said Galilean type system being a negative absolute value, said two absolute values being substantially equal, whereby the Petzval sum of the objective is maintained at a value approaching zero, the ratio of the shortest focal length to the longest focal length of the objective lens system being 1:4, the axial distance between the front stationary system and the movably positioned Galilean type system being equal for a focal length ranging from the shortest focal length to the longest focal length of the objective lens system, the axial distance between the rear stationary system and the movably positioned convergent system being approximately 17 times greater for the longest focal length of the objective lens system than for the shortest focal length of the objective lens system, the axial distance between the front stationary system and the movably positioned Galilean type system being approximately 1.5 times the axial distance between the rear stationary system and the movably positioned convergent system for the shortest focal length of the objective lens system and approximately 0.09 times the axial distance between the rear stationary system and the movably positioned convergent system for the longest focal length of the objective lens system, the characteristics of the lenses being substantially in the proportions indicated by the data in the following table:

wherein the lenses are numbered in order from front to rear in the first column, R represents the radius of curvature in millimeters of the lens surfaces, the respective surfaces being numbered from front to rear and being identified by the subscript numeral used with each R, with plus and minus values of R indicating curved surfaces which are respectively convex and concave toward the front, $e$ represents the thickness in millimeters of the lens, $n_D$ represents the refractive index of the lens, and $\nu$ represents the Abbe V number, the lenses $L_1$ and $L_2$ represents the front stationary system of lenses, the lenses $L_3$ and $L_4$ represents the Galilean type system, $L_5$, $L_6$, $L_7$ and $L_8$ represents the convergent system of lenses, and $L_9$, $L_{10}$ and $L_{11}$ represents the rear stationary system of lenses.

References Cited in the file of this patent
UNITED STATES PATENTS

| | | |
|---|---|---|
| 1,947,669 | Warmisham et al. | Feb. 20, 1934 |
| 2,159,394 | Mellor et al. | May 23, 1939 |
| 2,847,907 | Angenieux | Aug. 19, 1958 |

FOREIGN PATENTS

| | | |
|---|---|---|
| 440,397 | Great Britain | Sept. 26, 1934 |

| 1 Lens | 2 R | 3 $e$ | 4 $n_D$ | 5 $\nu$ |
|---|---|---|---|---|
| $L_1$ | $R_1 = -603.63$<br>$R_2 = -84.51$ | $e_1 = 24.10$ | 1.62000 | 36 |
| $L_2$ | $R_3 = +134.61$ | $e_2 = 12.10$ | 1.62000 | 60 |
| $L_3$ | $R_4 = +103.22$<br>$R_5 = -435.64$ | $e_3 = 30.20$ | 1.72000 | 50 |
| $L_4$ | $R_6 = -161.29$<br>$R_7 = +94.59$ | $e_4 = 12.10$ | 1.72300 | 38 |
| $L_5$ | $R_8 = -256.50$<br>$R_9 = +351.31$ | $e_5 = 12.10$ | 1.7315 | 28 |
| $L_6$ | $R_{10} = -120.73$ | $e_6 = 30.20$ | 1.7448 | 45 |
| $L_7$ | $R_{11} = +120.73$<br>$R_{12} = -351.31$ | $e_7 = 30.20$ | 1.7448 | 45 |
| $L_8$ | $R_{13} = +256.50$ | $e_8 = 12.10$ | 1.7315 | 28 |
| $L_9$ | $R_{14} = +103.22$<br>$R_{15} = -435.64$ | $e_9 = 12.10$ | 1.6200 | 60 |
| $L_{10}$ | $R_{16} = -120.73$<br>$R_{17} = +94.59$ | $e_{10} = 6$ | 1.6200 | 36 |
| $L_{11}$ | $R_{18} = +351.31$<br>$R_{19} = -211.30$ | $e_{11} = 12.10$ | 1.6200 | 60 |